July 21, 1959 G. F. SCHROEDER 2,895,339
CORRECTION SYSTEM FOR MASS SHIFT IN GYROS
Filed Nov. 12, 1958
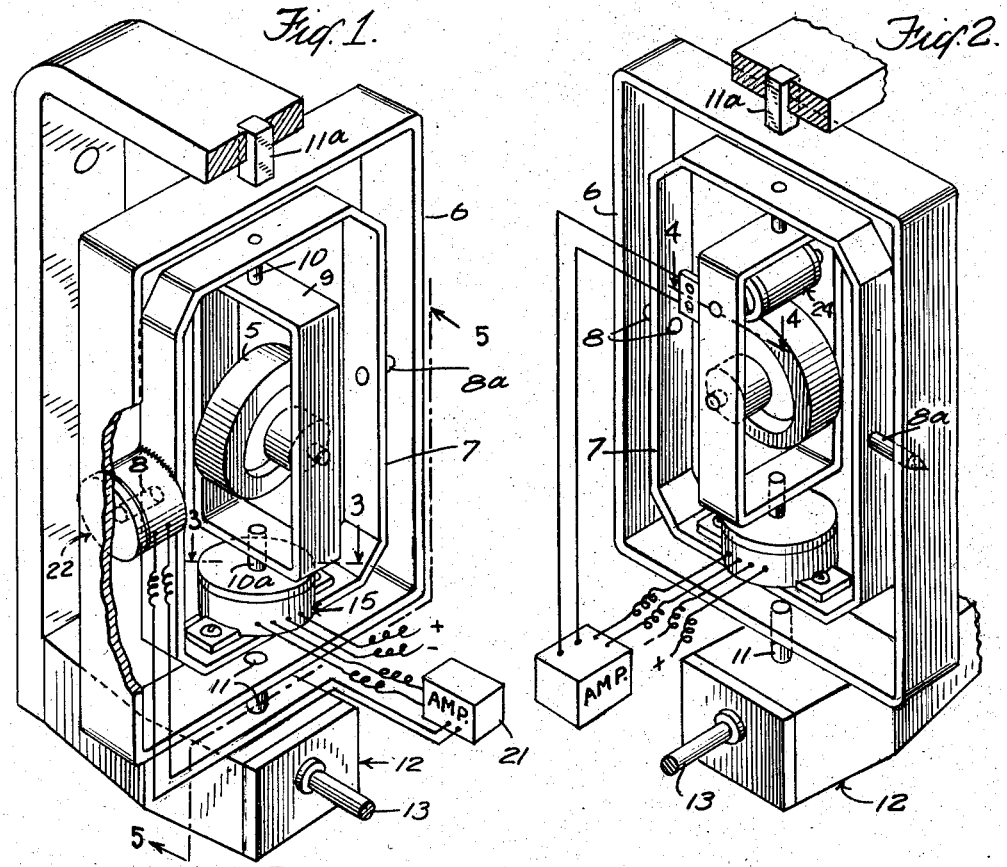
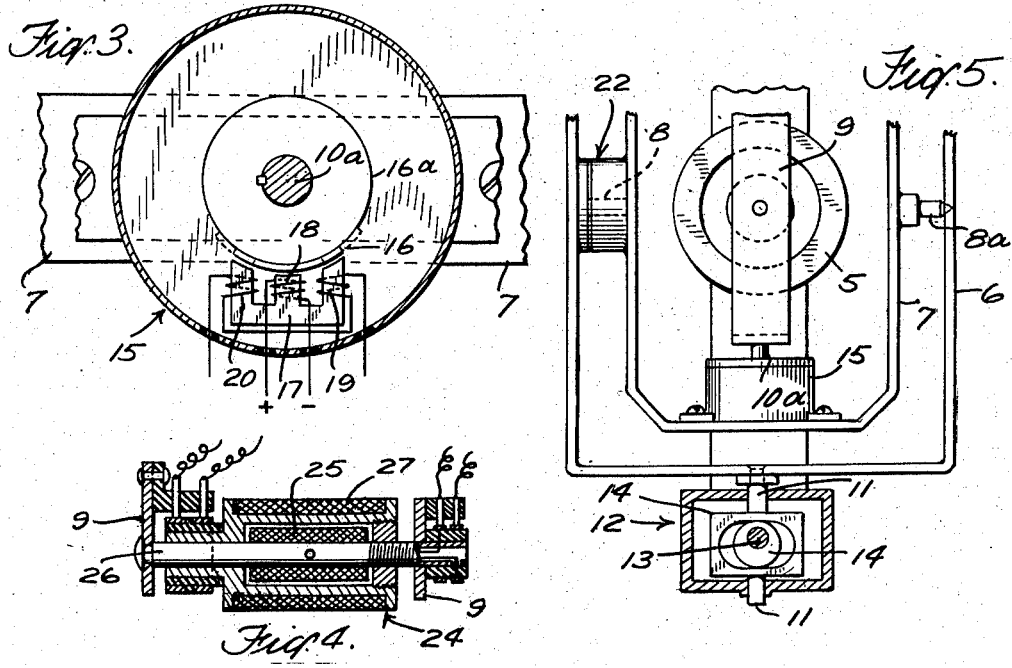

United States Patent Office 2,895,339
Patented July 21, 1959

2,895,339

CORRECTION SYSTEM FOR MASS SHIFT IN GYROS

George F. Schroeder, Pines Lake, N.J., assignor to Sperry Rand Corporation, Ford Instrument Company Division, Wilmington, Del., a corporation of Delaware Application November 12, 1958, Serial No. 773,223

10 Claims. (Cl. 74—5.47)

This invention relates to a gyroscope and more particularly to gyroscopes having a compensator to detect and compensate for shift.

It is known that precession occurs about the vertical or input axis of gyroscopes due to an unbalance in the device caused by a shift. This invention contemplates the provision of means to detect any mass shift of the gyro mechanism out of balanced position and to means to correct for the shift by shifting a mass specially attached to the device or by causing the gyromechanism to precess in such a way as to compensate for the erroneous precession. Preferably, a differential transformer is used to detect any shift and either a motor having a shiftable stator or a torquer which are adapted to be actuated in accordance with output signals from the differential transformer is provided to cause a compensating precession of the gyro.

An object of the invention is to provide a gyro mechanism having means for detecting and correcting for shift.

Other objects and advantages of the invention may be appreciated from the following detailed description taken in conjunction with the accompanying drawings, in which Fig. 1 is a view of a gyro mechanism in which a torque motor is provided to correct for gyro unbalance;

Fig. 2 is a view of a gyro mechanism having a mass unbalance compensator in the form of a traveling stator motor;

Fig. 3 is a section taken on line 3—3 of Fig. 1 showing the differential transformer used to detect the unbalance in the gyro due to shift;

Fig. 4 is a section taken on line 4—4 of Fig. 2 showing a traveling stator motor employed by the gyro mechanism, and Fig. 5 is a section taken on line 5—5 of Fig. 1 showing a reciprocal linear motion generator employed to impart reciprocal linear motion to the gyro mechanism.

As shown in Fig. 1, there is provided a gyro mechanism having, a housing or frame 6, an outer gimbal 7 mounted on horizontal turning shafts 8 and 8a supported by the frame, an inner gimbal 9 mounted on vertical turning shafts 10 and 10a carried by the outer gimbal and a gyro wheel 5 which is mounted upon a shaft which is carried by the inner gimbal 9.

The frame 6 is suitably supported for vertical reciprocal but non-rotary motion by shafts 11 and 11a. Reciprocal motion is constantly imparted to the gyro mechanism by reciprocal linear motion generator 12 which comprises a motor shaft 13 on which is mounted an eccentric cam 14. The follower for the rotatable cam 14 is a yoke strap 14a integrally attached to the shaft 11 which causes the device to reciprocate on operation of the motor shaft 13. If the gyro mechanism is in balanced condition, the reciprocal motion imparted to the mechanism will have no effect upon the mechanism, but if there has been any shifting of the mechanism out of balanced condition the reciprocal motion will cause an oscillatory vibrational precession about the inner gimbal axis, the frequency of which will be proportional to the frequency of reciprocation.

A precession detector or pickup unit such as a differential transformer 15 shown diagrammatically in Fig. 3 is employed by the correction system to detect any precession of the inner gimbal 9 about its vertical axis. The transformer 15 comprises an arcuately formed bar armature 16 secured to a nonmagnetic, cylindrical member 16a mounted on the shaft 10a and a saturable core 17 having three legs, there being arranged a current winding 18 on the middle leg and load windings 19 and 20 on the other two legs. The core 17 is fixed to the housing of the device which is supported on the outer gimbal 7. The load windings have opposite polarity so that the current through the load is zero when the armature is centrally located over the core. However, on movement of the armature, as in this instance on precession of the gimbal 9, a reluctance differential is presented to the flux paths through the outside legs of the core, and a current is induced through the load in one direction or the other depending on the displacement of the armature.

As shown in Fig. 1, the pickup or transformer is connected to a conventional amplifier 21, having a phase detector which is tuned to the frequency of the reciprocating device 12. Amplifier 21, demodulates the electrical output of the detector 15 and by means of a suitable tuned circuit amplifies that portion of the detector electrical output caused by the oscillatory vibrational precession. This amplified signal is rectified and applied to a torquer 22, which is adapted to place a torque on the outer gimbal shafts. By means of the above circuit the steady state positional portion of the electrical output of detector 15 is rejected.

The torque placed upon the outer gimbal is such as will cause the inner gimbal to precess oppositely in direction to that which resulted from the mass unbalance. The precession error due to the unbalance is thereby corrected.

There is shown in Fig. 2, an alternate compensation means in which the torquer is replaced by a traveling stator type motor 24 which serves to shift a mass so as to compensate unbalance causing the precession error. In this case, the motor itself includes a movable mass. The motor has a rotor 25 fixed to lead screw 26 and energized by the amplifier 21 and a stator 27 in threaded engagement with the lead screw 26 which is carried by the gimbal 9. According to the degree and direction or precession of the gimbal caused by the shift to the unbalanced state, the stator is caused to travel as a unit in one direction or the other to compensate for the shift and nullify the output of the pickup. That is, the differential transformer amplitude is proportional to the amount of unbalance and its output phase as determined by the precession of the gimbal 7 on its axis is related to which side of center the mass unbalance is situated. This holds true regardless of the unit employed to compensate for or correct the unbalance.

It is to be understood that I am not limited to the specific construction shown and described herein as various modifications may be made therein within the spirit of the invention and the scope of the appended claims.

What is claimed is:

1. A gyro mechanism of the character described comprising a frame, means by which said frame is supported for vertically reciprocal but non-rotary movement, an outer gimbal, horizontally disposed shaft means carried by said frame by which said outer gimbal is mounted in said frame for rotation about a horizontal axis, an inner gimbal, vertically disposed shaft means carried by said outer gimbal by which said inner gimbal is mounted within said outer gimbal for rotation about a vertical axis, a gyro wheel, a supporting shaft carried by said inner gimbal by which said gyro wheel is mounted within said inner gimbal for rotation about a horizontal axis, the axes of said horizontally disposed shaft means, said vertically disposed shaft means and said supporting shaft all intersecting each other at a common point and said gyro wheel being mounted on said supporting shaft in balanced position with the center of mass thereof disposed at said common point, means by which said frame and the mechanism carried thereby are vertically reciprocated at a predetermined frequency, said reciprocation being operative to impart an oscillatory vibrational precession to said inner gimbal in the event said gyro wheel shifts out of balanced position in either direction along said supporting shaft, said torsional vibration being proportioned to the distance said gyro wheel has shifted out of balanced position and to the frequency of said reciprocation, an amplifier having a phase detector tuned to the frequency of said reciprocating means, pickup means carried by said mechanism, said pickup means being operative to detect any torsional vibration of said inner gimbal due to an unbalanced position of said gyro wheel and to impart a corresponding signal to said amplifier, and correcting means mounted on said mechanism and operative to cause a precession of said inner gimbal opposite to that caused by the unbalanced position of said gyro wheel, said correcting means being actuated by said amplifier in accordance with signals imparted thereto by said pickup means.

2. A gyro mechanism of the character described comprising a frame, means by which said frame is supported for vertically reciprocal but non-rotary movement, an outer gimbal, horizontally disposed shaft means carried by said frame by which said outer gimbal is mounted in said frame for rotation about a horizontal axis, an inner gimbal, vertically disposed shaft means carried by said outer gimbal by which said inner gimbal is mounted within said outer gimbal for rotation about a vertical axis, a gyro wheel, a supporting shaft carried by said inner gimbal by which said gyro wheel is mounted within said inner gimbal for rotation about a horizontal axis, the axis of said horizontally disposed shaft means, said vertically disposed shaft means and said supporting shaft all intersecting each other at a common point and said gyro wheel being mounted on said supporting shaft in balanced position with the center of mass thereof disposed at said common point, means by which said frame and the mechanism carried thereby are vertically reciprocated at a predetermined frequency, said reciprocation being operative to impart an oscillatory vibrational precession to said inner gimbal in the event said gyro wheel shifts out of balanced position in either direction along said supporting shaft, said torsional vibration being proportional to the distance said gyro wheel has shifted out of balanced position and to the frequency of said reciprocation, correcting means associated with said mechanism and operative to cause precession of said inner gimbal opposite to that caused by the unbalanced position of said gyro wheel, and pickup means mounted on said vertically disposed shaft means and operative to detect any torsional vibration of said inner gimbal and to impart a corresponding signal to said correcting means, said correcting means being rendered operative in accordance with signals thereto by said pickup means.

3. A gyro mechanism as defined by claim 2 in which said pickup means comprises a differential transformer and a relatively movable armature, one of which is mounted on said vertically disposed shaft means and the other of which is mounted on said outer gimbal.

4. A gyro mechanism as defined by claim 3 in which said correcting means comprises a torque motor mounted on said frame and operative to impart a precessing torque to said outer gimbal in a direction to compensate for a shift of said gyro wheel out of balanced position.

5. A gyro mechanism as defined by claim 3 in which said correcting means comprises a traveling stator type motor having a stator which is adapted to move back and forth along a stationary lead screw carried by said inner gimbal, and a rotor secured in fixed position on said lead screw and electrically connected to said pickup means.

6. A gyro mechanism of the character described comprising a frame, means by which said frame is mounted for vertically reciprocal but non-rotative motion, a gyroscope carried by said frame, means by which said frame and said gyroscope carried thereby are reciprocated, said reciprocation causing an oscillatory vibrational precession in said gyroscope in the event of any mass unbalance of said gyroscope, correcting means which is operative to cause a precession of said gyroscope opposite to that caused by said mass unbalance, and pickup means operative to detect any oscillatory vibrational precession in said gyroscope and to impart a signal to said correcting means, said correcting means being rendered operative in accordance with the signal imparted thereto.

7. A gyro mechanism as defined by claim 6 in which said pickup means comprises a differential transformer and a relatively movable armature.

8. A gyro mechanism as defined by claim 7 in which said correcting means comprises a torque motor carried by said frame and operatively connected to said gyroscope.

9. A gyro mechanism as defined by claim 7 in which said correcting means comprise a traveling stator type motor having a stator which is adapted to move back and forth along a stationary lead screw carried by said gyroscope, and a rotor secured in fixed position on said lead screw and electrically connected to said pickup means.

10. A mechanism of the character described comprising a gyroscope, means mounting said gyroscope for vertically reciprocal movement, means by which said gyroscope is constantly reciprocated to thereby cause oscillatory vibrational precession in said gyroscope in the event of any mass unbalance of said gyroscope, correcting means which is operative to cause a precession of said gyroscope opposite to that caused by said mass unbalance, and pickup means operative to detect any oscillatory vibrational precession in said gyroscope and to impart a signal to said correcting means, said correcting means being rendered operative in accordance with the signal imparted thereto.

References Cited in the file of this patent
UNITED STATES PATENTS

| 1,308,692 | Beattie | July 1, 1919 |
| 1,642,087 | Rosenbaum | Sept. 13, 1927 |
| 2,391,442 | Beach | Dec. 25, 1945 |